July 20, 1948.    R. H. HODGSON    2,445,482
AUTOMATIC TRANSMISSION
Filed May 1, 1946    2 Sheets-Sheet 1

INVENTOR
RICHARD HAROLD HODGSON
ATTORNEY

July 20, 1948.  R. H. HODGSON  2,445,482
AUTOMATIC TRANSMISSION

Filed May 1, 1946  2 Sheets-Sheet 2

INVENTOR
RICHARD HAROLD HODGSON
ATTORNEY

Patented July 20, 1948

2,445,482

UNITED STATES PATENT OFFICE 2,445,482

AUTOMATIC TRANSMISSION

Richard Harold Hodgson, Vancouver, British Columbia, Canada

Application May 1, 1946, Serial No. 666,498

4 Claims. (Cl. 74—260)

My invention relates to improvements in automatic transmissions, which are particularly adapted for automotive vehicles driven by internal combustion engines.

The objects of the invention are to provide a transmission giving two speeds forward, which are automatically operated up or down according to load conditions, and one in which no manual setting of the operating control either at starting or stopping is necessary, and also to provide a manually controlled reverse.

Referring to the drawings.

In the drawings like characters of reference indicate corresponding parts in each figure.

Figure 1:
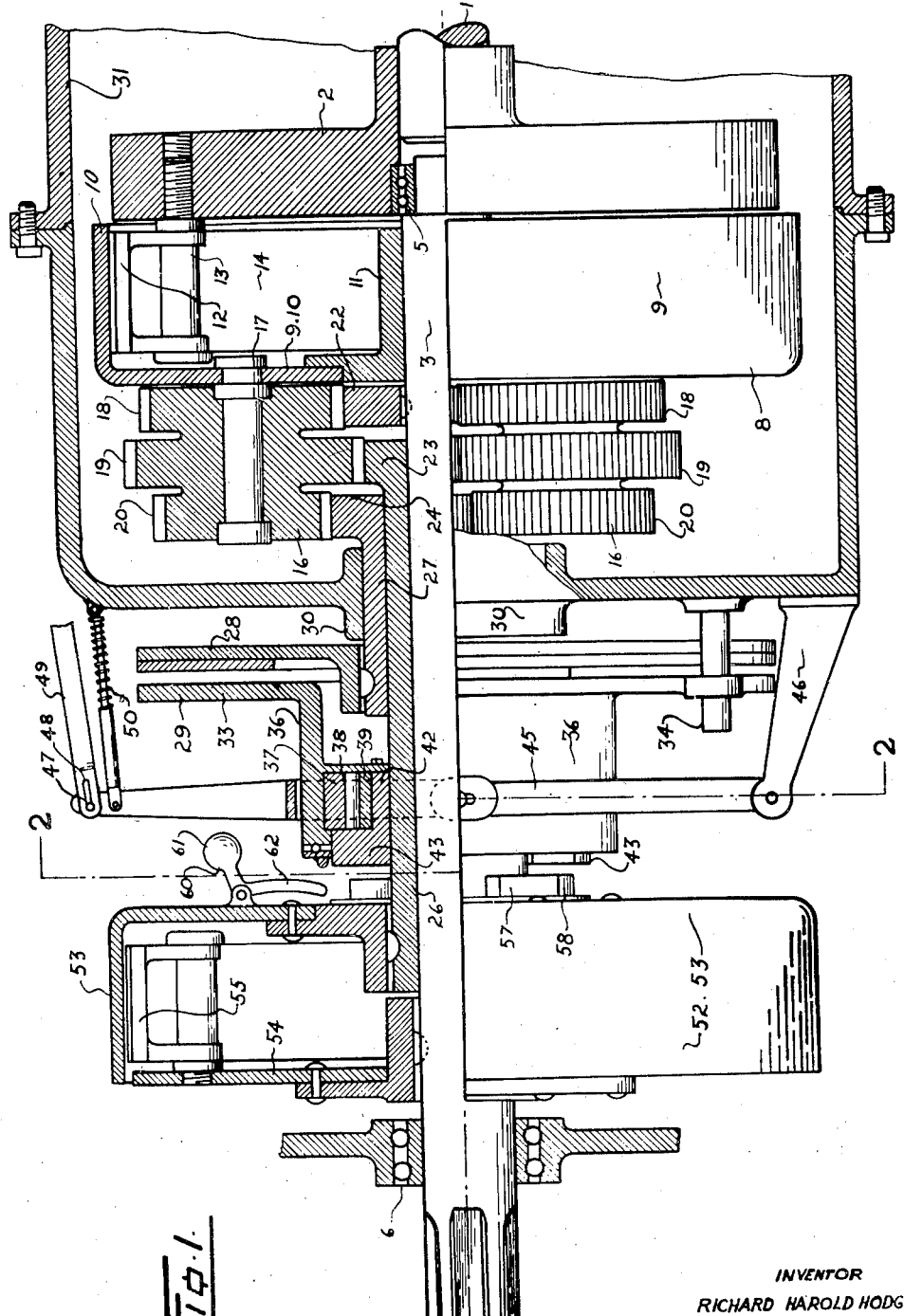
Fig. 1 is a longitudinal view of the invention showing part in section and part in elevation.
Figure 2:
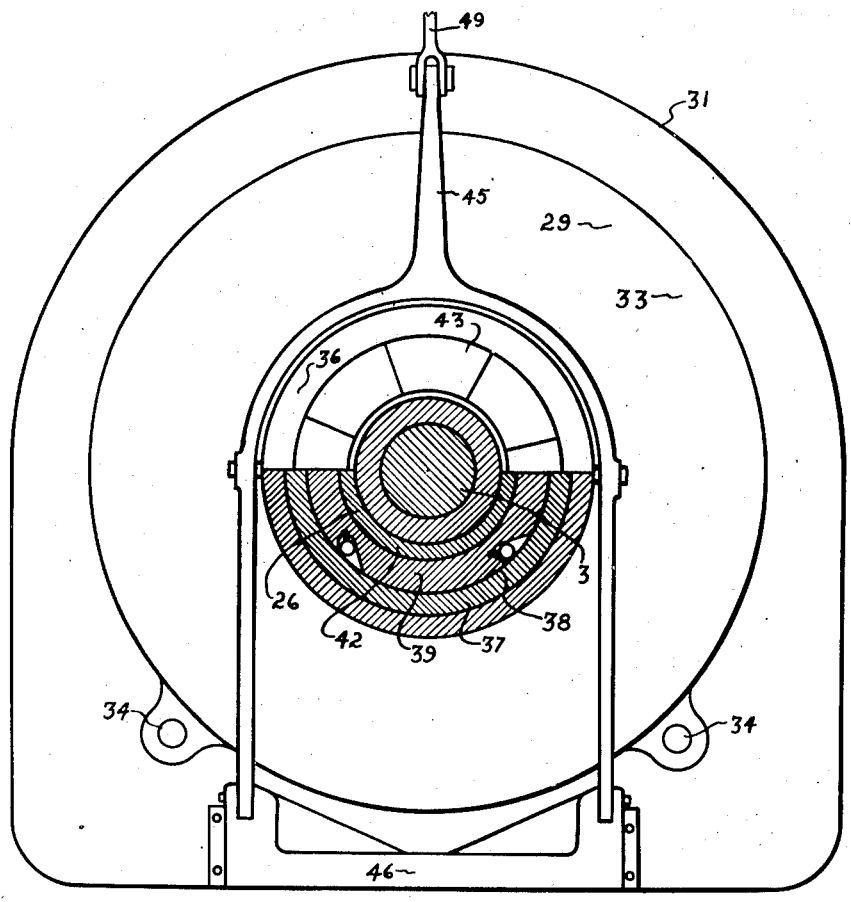
Fig. 2 is a transverse sectional view taken on the line 2—2 of Figure 1.

The numeral 1 indicates generally an engine shaft having a flywheel 2 secured thereon and the numeral 3 indicates an aligned shaft mounted in bearings 5 and 6. Associated with the flywheel is a centrifugal clutch 8 of the self-energizing type which may conveniently be in the nature of a double or triple shoe brake and which would, in private passenger type vehicles, be adjusted to engage at around 600 revolutions per minute. The centrifugal clutch 8 consists of a drum 9 having a flange 10 and a hub 11 freely rotatable upon the shaft 3. The flywheel 2 carries a clutch shoe assembly 12 consisting of the necessary anchor pins 13 secured to the flywheel, one only shown, and one or more clutch shoes 14 which are adapted to move outwardly by centrifugal force to engage the drum 9 and impart rotation to said drum.

A planetary train 16 is carried upon pins 17 from the flange of the drum 9, which revolve around the shaft 3. This train comprises idlers 18, 19 and 20, all of which are connected and are freely rotatable as units about the pins 17. Each idler 18 is in constant mesh with a gear 22 keyed to the shaft 3; the idlers 19 are in constant mesh with a gear 23, and the idlers 20 are in constant mesh with a gear 24. The gear 23 is integral with a long sleeve 26, which is freely rotatable about the shaft 3. The gear 24 is integral with a sleeve 27 to which a plate 28 of a brake 29 is secured. This sleeve is rotatable upon the sleeve 26 and is journalled in a bearing 30 carried by the housing 31.

The brake 29 includes a plate 33 which is held against rotation by longitudinally disposed guide pins 34 extending outwardly from the housing 31 and passing through suitable openings in the plate to permit said plate to be moved towards and away from the brake plate 28. The plate 33 is provided with a trunnion collar 36 in which the outer ring member 37 of an over-riding brake 38 is secured, and the inner ring member 39 of said brake is secured to a short sleeve 42 having a half dog clutch member 43 on one end. The over-riding brake 38 is so arranged as to permit the sleeve 42 to be held against anti-clockwise movement as viewed from the flywheel, which, as in usual practice, is assumed to turn in a clockwise direction from the engine. The trunnion collar 36 and its brake plate 33 are manually moved towards or away from the plate 28 by a forked lever 45 which is fulcrumed from a bracket 46, the upper end of the lever is connected by a pin 47 riding within a slot 48 of a push pull rod 49. The trunnion collar is resiliently urged away from the plate 28 by a compression spring 50. Mounted to the rear end of the shaft 3 is a second self-energizing clutch 52 which consists of a clutch drum 53 which is keyed to the long sleeve 26 and a disk 54 keyed to the shaft 3, which disk carries an appropriate expanding shoe assembly 55 capable of automatically engaging the drum 53 when the disk is rotating in a clockwise direction at a speed of around 600 R. P. M. and of automatically disengaging said drum when said disk drops to a given point below said speed.

The clutch drum 53 is fitted on its exterior face with a half dog clutch member 57 which with the member 43, forms a dog clutch 58, and also mounted on the drum 53 are one or more governors 60, each having a fly ball 61 and a lever 62, which latter bears against the rim of the trunnion collar when the drum 53 is rotating at speed to disengage the clutch 58.

It will be noted that when the transmission is in the position shown and assuming the engine to be idling below 600 R. P. M., the centrifugal clutch 8 will not be engaged and no rotation will be imparted to the drum 9. When the speed of clutch 8 is raised beyond the 600 R. P. M. or operating speed, the drum 9 will rotate, but as the gears 23 and 24 are unimpeded in rotation, they will turn freely and in opposite directions, and the gear 22 will cause the idlers 18, 19 and 20 to roll around the shaft 3 through the meshing engagement between the idler 18 and the gear 22. Obviously with this arrangement, the gear 23 will be running anti-clockwise and the gear 24 will be running clockwise by virtue of the difference in their diameters with respect to the gear 22.

In starting the engine would preferably be running at idling speed or below the 600 R. P. M. and the rod 49 would be moved to the rear to engage the dog clutch 58 and thus lock the sleeve 26 and the gear 23 against rotation. The locking thus referred to is caused by the inner ring member or annulus of the over riding brake 38 being incapable of turning in an anti-clockwise direction in respect to the trunnion collar 36, consequently the pinion 19 in rotating around the shaft 3 will cause a slow speed drive to be imparted through the idler 18 to the shaft 3 through the gear 22 in a clockwise direction. As soon as the second centrifugal clutch 52 reaches its 600 R. P. M. or given engaging speed, the clutch mechanism 55 expands and imparts its drive to the drum, simultaneously the torsional strain between the dog clutch member 57, which is starting to move, and the clutch member 43 which is held against anti-clockwise movement, is relieved, the governor 60 comes into play and disengages the dog clutch. When this disengagement has taken place, the drive is fully established between the clutch 52 and the long sleeve 26, therefore the gears 22 and 23 are rotating at the same speed and the planetary idlers are rotating as planet members about the shaft, giving high gear forward. It will be noticed that the sleeve 27 during this drive will also be rotating at shaft 3 or engine speed. Should the speed, when in high gear drop until the second centrifugal clutch 52 is rotating below the predetermined limit, the thrust of the spring 50 applied through the arm 62 of the governor will move the fly ball 61 towards the shaft 3 and cause the dog clutch 58 to re-engage, thus changing the drive back to low gear forward.

If the push pull rod 49 is pulled forwardly to bring the stationary plate 33 into engagement with the plate 28, the rotation of the sleeve 27 and its gear 24 will be brought to rest, so that with the drum 9 rotating and the pins 17 rotating in a clockwise direction about the axis of the shaft, the idler 20 will rotate around the gear 24 in a clockwise direction, causing the idler 18 to impart rotation in an anti-clockwise direction to the gear 22 which is keyed to the shaft 3, the drive then being in reverse. Obviously the reverse is obtained by manual operation only.

What I claim as my invention is:

1. An automatic transmission adapted for connection to an engine drive shaft, said transmission comprising a driven shaft aligned with said drive shaft, a clutch having a drive member engaging the drive shaft and a driven member, said drive and driven members being adapted for operative engagement in response to a predetermined increase in drive shaft speed, a gear secured to the driven shaft and two axially aligned and connected planet idlers mounted upon the driven member of the clutch, a sleeve rotatable upon the driven shaft, a gear secured to said sleeve, said gears being in meshing engagement with the two planet idlers, an overriding brake having a non-rotatable annulus and an annulus rotatable in one direction around the sleeve, means for slidably supporting the fixed annulus, a second clutch having an engagement mechanism and a drum to be engaged thereby in response to a predetermined increase of the driven speed of the engaging mechanism, said engaging mechanism portion of the second clutch being secured to the driven shaft and said drum being secured to the sleeve, a positive drive clutch interposed between the drum and the rotatable annulus of the overriding brake, means for resiliently urging the positive drive clutch into engaging position, means response to speed increase of the second clutch for disengaging the positive drive clutch, and manually operable means for moving the positive drive clutch into disengaging position.

2. An automatic transmission adapted for connection to an engine drive shaft, said transmission comprising a driven shaft aligned with said drive shaft, a clutch having a drive member engaging the drive shaft and a driven member, said drive and driven members being adapted for operative engagement in response to a predetermined increase in drive shaft speed, a gear secured to the driven shaft and two axially aligned and connected planet idlers mounted upon the driven member of the clutch, a sleeve rotatable upon the driven shaft, a gear secured to said sleeve, said gears being in meshing engagement with the two planet idlers, an overriding brake having a non-rotatable annulus and an annulus rotatable in one direction around the sleeve, means for slidably supporting the fixed annulus, a second clutch having an engaging mechanism and a drum to be engaged thereby in response to a predetermined increase of the driven speed of the engaging mechanism, said engaging mechanism portion of the second clutch being secured to the driven shaft and said drum being secured to the sleeve, a positive drive clutch interposed between the drum and the rotating annulus of the overriding brake, means for resiliently urging the positive drive clutch into engaging position, a centrifugal governor associated with the second clutch drum for sliding the overriding brake along the sleeve to disengage the positive drive clutch, and manually operable means for moving the positive drive clutch into disengaging position.

3. An automatic transmission adapted for connection to an engine drive shaft, said transmission comprising a driven shaft aligned with a drive shaft, a self-energizing clutch having a drive member connected to the drive shaft and a driven member rotatable about the driven shaft, said clutch being adapted to engage at a given speed of rotation, a gear secured to the driven shaft, a planetary train consisting of a pair of connected idlers mounted upon the face of the driven member of the self-energizing clutch, one of said idlers being in constant mesh with the gear upon the shaft, a sleeve journalled upon the shaft, said sleeve having a gear at one end engaging the second of the pair of idlers, a second self-energizing clutch having a drive and a driven member, said clutch being also adapted to engage at a given speed of rotation, said drive member of the second clutch being secured to the shaft and said driven member of said clutch having a half dog clutch mounted thereon concentrically with the shaft, a second half clutch mounted upon the sleeve, means for preventing the second half clutch from rotating in one direction with the shaft, and means responsive to speed increase and decrease of the driven member of the second self-energizing clutch for respectively disengaging and reengaging the dog clutch halves, and manually operable means for disengaging the dog clutch.

4. An automatic transmission adapted for connection to an engine drive shaft, said transmission comprising a driven shaft aligned with said drive shaft, a clutch having a drive member engaging the drive shaft and a driven member, said drive and driven members being adapted for operative engagement in response to a predetermined increase in drive shaft speed, a gear secured to the driven shaft and three axially aligned and connected planet idlers mounted upon the driven member of the clutch, a long sleeve rotatable upon the driven shaft, said long sleeve having a gear secured at one end, a second sleeve rotatable upon the long sleeve and a gear secured to the second sleeve, each of said gears being in constant mesh with one of the planet idlers, said second sleeve having a brake plate secured thereto, a non-rotatable brake plate concentric with the shaft, and manually operable means for slidably moving the non-rotatable brake plate towards the rotatable brake plate, an over-riding brake having an annulus non-rotatable with the slide brake plate, an annulus rotatable only in one direction, said annulus being freely mounted upon the long sleeve, a positive drive clutch having two opposing members, one of said members being integral with the annulus upon the long sleeve, spring means for urging the positive drive clutch members into driving engagement, a second clutch having a driven and a driving element surrounding the shaft and being adapted to engage in response to a predetermined increase in speed of the driving element, said driving element being secured to the driven shaft and said driven element and said second opposing member of the positive drive clutch being connected to the long sleeve, speed responsive means operatively connected to said driven element for urging the positive drive clutch to disengage, and said manually operable means serving to disengage said positive drive clutch.

RICHARD HAROLD HODGSON.

REFERENCES CITED

The following references are of record in the file of this patent:

UNITED STATES PATENTS

| Number | Name | Date |
|---|---|---|
| 1,727,603 | Johnson | Sept. 10, 1929 |
| 1,781,925 | Johnson | Nov. 18, 1930 |
| 1,909,191 | Stafford | May 16, 1933 |
| 1,937,503 | Banker | Dec. 5, 1933 |

FOREIGN PATENTS

| Number | Country | Date |
|---|---|---|
| 746,253 | France | May 26, 1933 |